United States Patent

[11] 3,587,184

[72] Inventor Frank A. Walker, Jr.
 Huntington Beach, Calif.
[21] Appl. No. 835,471
[22] Filed June 23, 1969
[45] Patented June 28, 1971
[73] Assignee Master Specialties Company,
 Costa Mesa, Calif.

[54] PANEL SEAL
 3 Claims, 5 Drawing Figs.
[52] U.S. Cl. ..................................................... 40/130,
 240/152
[51] Int. Cl. ........................................................ G09f 13/00
[50] Field of Search............................................. 40/130,
 132, 331; 240/151, 152, 2.1, 8.16, 41.55

[56] References Cited
 UNITED STATES PATENTS
2,163,329 6/1939 Sipior........................... 40/132

| 2,914,656 | 11/1959 | Keith..................... | 240/152X |
| 3,162,375 | 12/1964 | Huston.................. | 240/8.16 |
| 3,286,255 | 11/1966 | Sanchez................ | 240/151X |
| 3,416,251 | 12/1968 | Bordner................ | 40/132 |

Primary Examiner—Robert W. Michell
Assistant Examiner—Richard Carter
Attorney—Owen and Owen ABSTRACT: A dust and moisture seal assembly for an indicator light opening in a control panel. A retainer clip is attached to the panel to define a groove extending continuously around and facing away from the opening. A light passing elastomeric seal extends across the panel opening. The seal has an integral lip which is positioned in the groove and sealably engages the panel. A legend plate is attached to the outer surface of the seal by means of a second lip.

PATENTED JUN28 1971 3,587,184
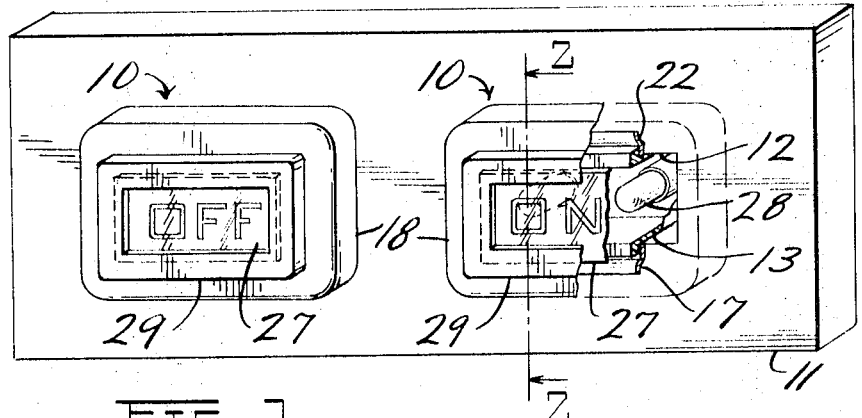
FIG-1-
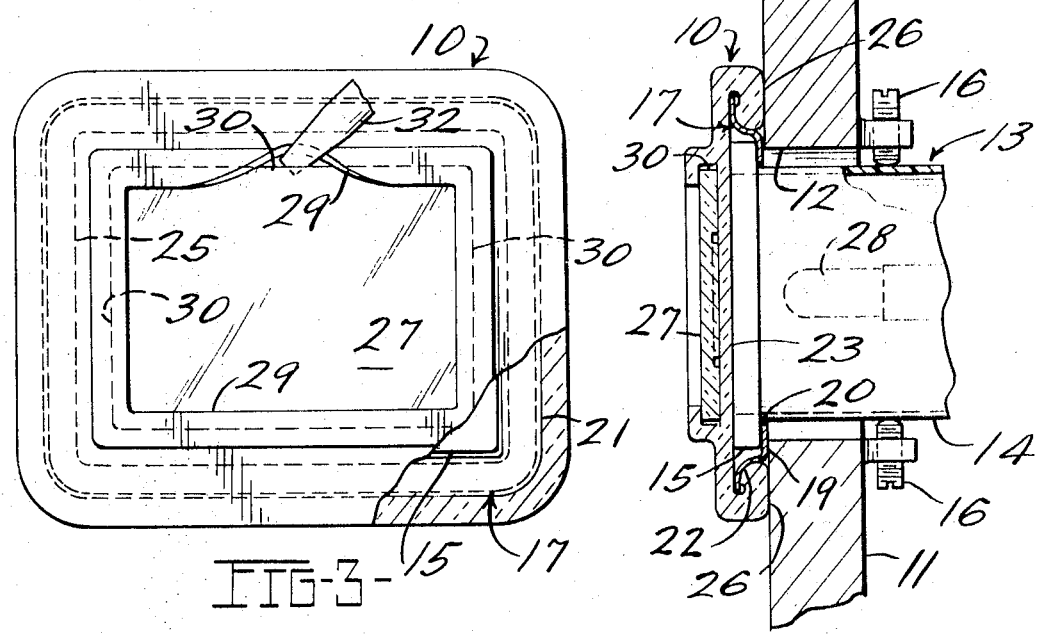
FIG-3-
FIG-2-
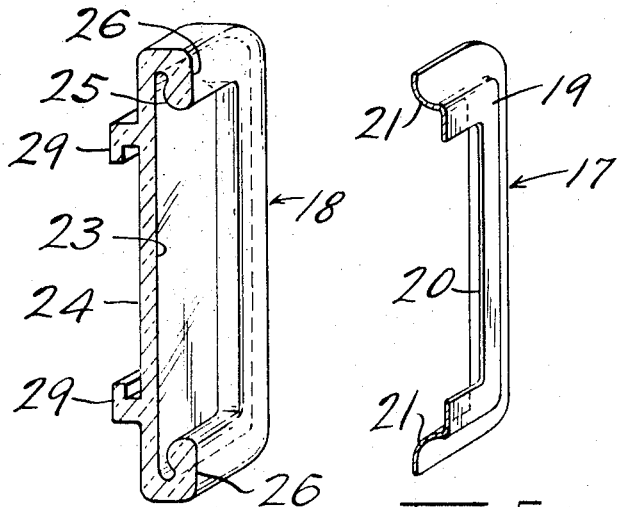
FIG-4- FIG-5-
INVENTOR:
FRANK A. WALKER, JR.
BY
ATT'YS

PANEL SEAL

BACKGROUND OF THE INVENTION

This invention relates to seal assemblies and, more particularly, to a seal assembly for panel mounted indicator light units.

Panel mounted indicator light units are commonly used in industrial control panels, ships, aircraft, and manned spacecraft. Such indicator units contain a legend plate which is illuminated to warn of a malfunction of a particular component or of the occurrence of a monitored condition. Many installations of indicator light units subject such units to large environmental variations, particularly to variations in humidity and dust. Such environmental variations adversely affect the reliability of the indicator light units. It is therefore desirable to seal all cracks and openings between units and the panel on which they are mounted. The seal must however be readily removable to permit relamping of the indicator unit from the front of the panel. Relamping of indicator units is typically accomplished either by removing a legend plate assembly or by rotating the front of the unit to expose the lamps to the front of the panel.

SUMMARY OF THE INVENTION

The instant invention is directed to a dust and moisture seal for panel mounted indicator light warning units of the type used in aircraft and ships. The seal is designed to completely enclose an opening cut in the panel for mounting the indicator light unit. A retainer clip is attached to the panel around the opening either by clamping between the indicator and the panel or by welding or other suitable means. The retainer clip defines a groove with the panel which extends continuously around the panel opening and is directed away from the panel opening. The seal, which is formed from a light passing elastomeric material, has a generally flat portion which completely encloses both the panel opening and the retainer clip and has an integral lip which is positioned within the groove and sealably engages the panel. The outer surface of the seal includes a lip for releasably attaching a legend plate. The legend plate bears a message or warning relating to the condition which causes the associated indicator light unit to be illuminated. When the indicator light unit is illuminated, light passes through the seal to illuminate the message on the legend plate. The seal is designed such that the legend plate may be readily removed from the front of the seal for changing, and the seal may be readily removed from the panel for relamping of the indicator unit.

Accordingly, it is a primary object of the invention to provide an improved panel seal for panel mounted indicator light units.

Other objects and advantages of the invention will become apparent from the following detailed description, reference being made to the accompanying drawings.

BRIEF DESCRIPTION OF THE DRAWINGS

FIG. 1 is a perspective view of a panel including two indicator light units and panel seals for each of the units constructed in accordance with the instant invention, with one of the panel seals and the associated indicator unit partially broken away;

FIG. 2 is a cross-sectional view taken along the line 2-2 of FIG. 1;

FIG. 3 is a front elevational view of a panel seal according to the instant invention and showing a legend plate being released for changing;

FIG. 4 is a cross-sectional view of a panel seal according to the instant invention; and FIG. 5 is a cross-sectional view of a retainer clip for the panel seal.

DESCRIPTION OF THE PREFERRED EMBODIMENT

Referring now to the drawings, a panel seal assembly 10 is shown according to the instant invention. A portion of a panel 11 is shown in perspective in FIG. 1 and in cross section in FIG. 2. The panel 11 is provided with one or more openings 12, each of which is adapted to receive an indicator light unit 13. Although various designs of indicator light units 13 and various types of panel mounts may be used, the light unit 13 is shown as having a body portion 14 which passes through the panel opening 12 and a front flange portion 15 which will not pass through the opening 12. The indicator light unit 13 is attached to the panel by inserting the body portion 14 through the opening 12 from the front of the panel 11 and tightening one or more setscrews 16 against the body portion 14.

The panel seal assembly 10 basically includes a retainer clip 17 and a seal 18. The retainer clip 17 is preferably made of sheet metal, although a rigid synthetic resinous material may be used. The retainer clip 17 has a flat surface portion 19 for attaching to the panel 11 and a central opening 20 which is aligned with the panel opening 12 for passing the body portion 14 of the indicator light unit 13. The flat surface 19 of the clip 17 is attached to the panel 11 either by clamping between the flange 15 of the indicator unit 13 and the panel 11 or by any other suitable method such as by welding. The clip 17 has a curved outer edge 21 which defines a groove 22 with the panel 11. The groove 22 extends continuously about the panel opening 12.

The seal 18 is molded from a light passing elastomeric material such as a transparent or translucent silicone rubber or neoprene. Where a colored warning is desired, the seal material may contain the desired coloring. The seal 18 has generally flat inner and outer surfaces 23 and 24, respectively. The inner surface 23 is shaped to completely encompass the panel opening 12 and the retainer clip 17. An integral lip 25 extends inwardly from the inner surface 23 of the seal 18 and is positioned within the groove 22. The lip 25 is compressed within the groove 22 and extends continuously around the clip 17 such that an inner edge 26 sealably engages the panel 11 completely around the panel opening 12.

The outer surface 24 of the seal 18 is adapted to releasably engage a legend plate 27. The legend plate 27 is preferably constructed from a rigid shock-resistant synthetic resinous material and includes a message or warning, such as the words "OFF" and "ON" as shown on the two legend plates 27 in FIG. 1. When the indicator light unit 13 is energized, the message on the legend plate 27 is illuminated by light passing from a lamp 28 through the seal 18. The legend plate 27 is attached to the seal 18 by means of a lip 29 which is integral with and projects from the outer surface 24 of the seal 18. The lip 29 preferably extends completely around and overlaps an edge 30 of the legend plate 27. As shown in FIG. 3, the legend plate 27 is removed from the seal 18 by inserting a suitable tool, such as a screw driver 32, under the lip 29 of the seal 18 and prying the legend plate 27 free.

In the event that the lamp 28 in the indicator unit 13 should burn out, access is provided for relamping through the front of the panel 11 by removing the seal 18. The seal 18 is removed by prying the lip 25 from the groove 22 between the retainer clip 17 and the panel 11. After relamping, the seal 18 may be readily attached to the groove 22 to again sealably engage the panel 11.

I claim:

1. In a panel having an opening adapted to receive an indicator light unit, a panel seal assembly comprising, in combination, a retainer clip having a central opening, means for attaching said retainer clip to the panel with said retainer clip opening aligned with the panel opening, said retainer clip defining a groove with the panel, said groove opening away from and extending continuously around the panel opening, a seal formed of a light passing elastomeric material and having inner and outer surfaces, said inner surface covering said retainer clip and the panel opening, said seal having an integral continuous inwardly facing lip positioned in said groove and sealably engaging the panel, a legend plate, and means for releasably attaching said legend plate to said outer surface of said seal.

2. A panel seal assembly, as defined in claim 1, wherein said means for releasably attaching said legend plate to said outer surface of said seal comprises a flexible lip integral with and extending from said outer surface of said seal, said flexible lip extending continuously around the edge of said legend plate.

3. A panel seal assembly, as defined in claim 2, wherein said seal is formed from transparent silicone rubber.